May 24, 1938.   G. A. LYON   2,118,256
ORNAMENTAL FENDER SKIRT
Filed Aug. 29, 1936   2 Sheets-Sheet 1
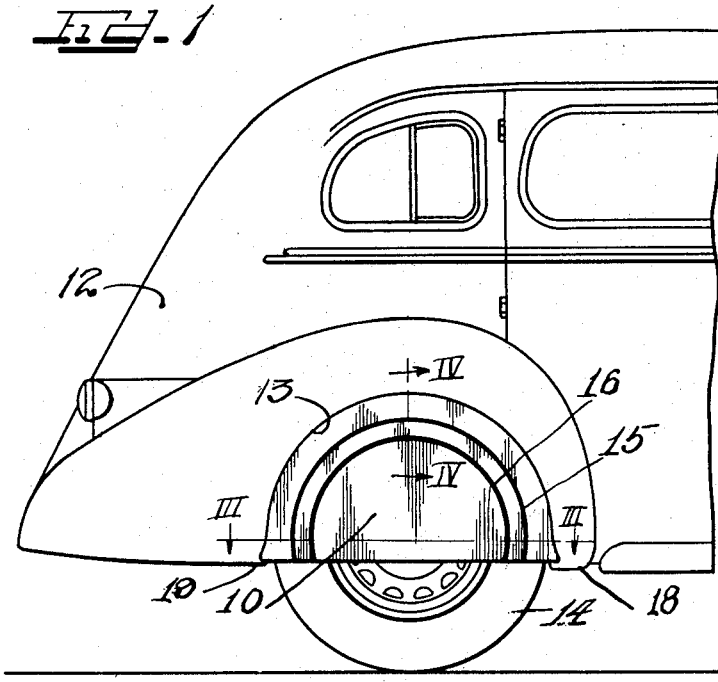
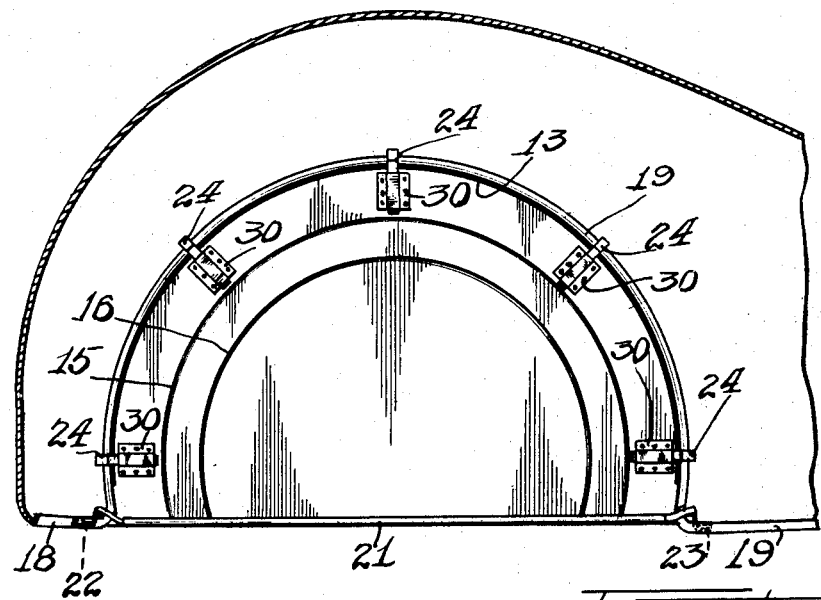
Inventor
GEORGE ALBERT LYON.

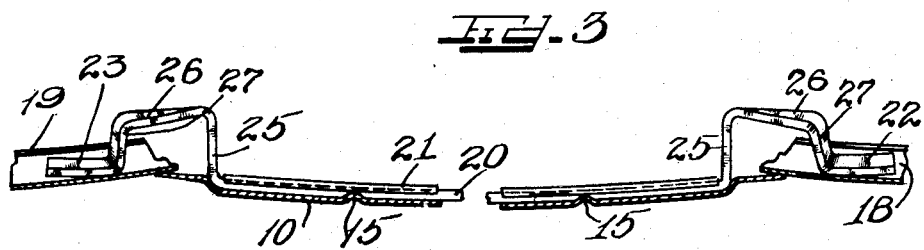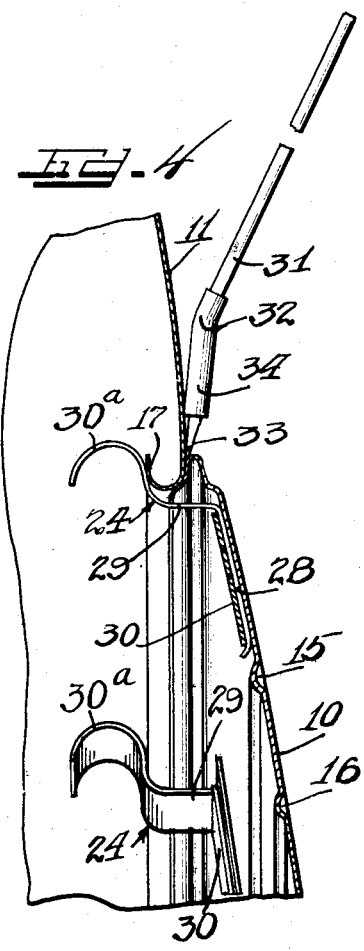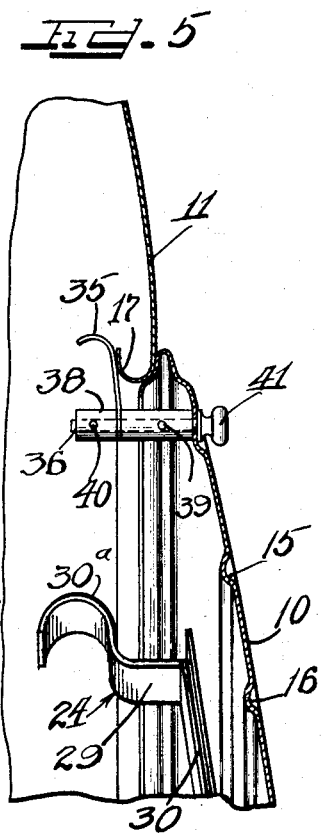

Patented May 24, 1938

2,118,256

REISSUED

UNITED STATES PATENT OFFICE 2,118,256

ORNAMENTAL FENDER SKIRT

George Albert Lyon, Allenhurst, N. J., assignor to Lyon Incorporated, Detroit, Mich., a corporation of Delaware Application August 29, 1936, Serial No. 98,441

13 Claims. (Cl. 280—153)

This invention relates to ornamental fender skirts, and more particularly to skirts which are adapted to be held in detachable snap-on engagement with vehicle fenders.

In the vehicle industry, and particularly in the automobile industry, various means have been utilized to improve the appearance of vehicle fenders. The usual vehicle fender is provided with an opening which affords access to the vehicle wheel and which permits the ready removal of the wheel in an axial direction. Since this opening inherently presents an ugly outward appearance, detachable fender skirts have been employed to substantially cover this opening. As the term "fender skirt" shall hereinafter be employed, it refers to any member which is adapted to be secured to a fender for the purpose of covering that opening therein which is provided for access to or removal of a vehicle wheel.

Widespread commercial adoption of fender skirts has not yet appeared in this country, and two cardinal reasons may be assigned to this lack of widespread commercial success, namely, first, the fender skirts known to the industry have been inherently clumsy and slow to assemble on a vehicle fender, and, second, unless elaborate clamping means were employed, the fender skirt had a tendency to rattle when the vehicle was in motion. It is an object of this invention to provide a novel fender skirt which is devoid of the above objectionable features.

It is a further object of this invention to provide an improved fender skirt which is economical to manufacture and which is rugged and reliable in use.

It is a still further object of this invention to provide a novel ornamental fender skirt which is adapted to be held in detachable snap-on engagement with a vehicle fender.

Another object of this invention is to provide a novel ornamental fender skirt having trunnion members and resilient snap-on members for detachably retaining a fender skirt in desired position on a vehicle fender.

Another and further object of this invention is to provide a novel combination of vehicle fender and ornamental fender skirt.

A further object of this invention is to provide a novel combination of vehicle fender, ornamental fender skirt, and disengaging means therefor.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a side elevational view of the rear part of an automobile, showing the vehicle fender and one embodiment of my novel ornamental fender skirt mounted thereon;

Figure 2 is a side elevational view, partly in cross-section, of a vehicle fender and a fender skirt, as viewed from the wheel looking out;

Figure 3 is a plan view, partly in cross-section, taken along the line III—III of Figure 1, showing the trunnion member mounted on the fender skirt and engaging the vehicle fender;

Figure 4 is an enlarged sectional view, partly in cross-section, of a portion of the fender skirt taken through one of the resilient fingers, as indicated by the line IV—IV of Figure 1; and Figure 5 is an elevational view, partly in cross-section, similar to Figure 4 but showing a modified form of skirt retaining means.

In Figures 1 and 2 of the drawings, I have illustrated a fender skirt 10 constructed in accordance with the teachings of the present invention and assembled on a rear fender 11 of an automobile 12. The fender 11 is formed with the usual opening 13 which affords access to the vehicle wheel 14 and which permits ready removal of the wheel 14 in an axial direction. The ornamental fender skirt 10 is disposed over the opening 13 in such a manner as to substantially close the opening and to harmonize with the outer side wall of the fender 11. The outer surface of the skirt 10 may be provided with any desired configuration for purposes of ornamentation. In the embodiment shown in the drawings, two ornamental members, indentations or grooves 15 and 16 are provided.

As shown in Figure 4, the outer marginal edge of the fender 11 which defines the opening 13 is underturned, as at 17, while the outer marginal edges which define the base of the fender are underturned, as indicated at 18 and 19. This underturning of the outer fender edge is a process which is commonly followed in the vehicle industry, and as will presently be explained, advantage is taken of this feature to assemble and secure an ornamental skirt in the fender opening.

In order to provide a support for the fender skirt 10, a bar 20 is secured to the base 21 of the skirt in any suitable manner, such as by rolling the marginal edge portion of the base 21 about the bar. The bar 20 is so dimensioned as to extend beyond either end of the skirt 10 to form trunnion members 22 and 23 which are adapted to be supported by the underturned edges 18 and 19, respectively, of the fender 11. A series of axially extending resilient fingers 24 secured to the circular edge portion of the skirt 10 are adapted to be cammed over the underturned edge 17 of the fender 11 into skirt retaining engagement therewith. The ornamental fender skirt 10 is thus securely and firmly mounted on the fender 11 by the trunnion members 22 and 23 and the fingers 24.

The precise character of the bar 20 which forms the trunnion members 22 and 23 may be seen best in Figure 3 of the drawings. In proximity to the junction points of the fender skirt 10 with the fender 11, the bar 20 at either end is bent first axially inwardly, as at 25, then radially outwardly, as at 26, then axially outwardly, as at 27, and finally radially outwardly into the portions which form the trunnion members 22 and 23. This peculiar bending of the bar 20 permits the bar to freely extend around the underturned edge portions of the fender 11 at the junction point of the circular opening 13 with the base portion of the fender, as is necessary to permit the disposition of trunnion members 22 and 23 into the channel portions of the fender 11 formed by the underturned edge portions 18 and 19. With the bar 20 formed in this manner, the trunnion members 22 and 23 may be inserted in the underturned edge portions 18 and 19, and then the fender skirt 10 may be rocked into the desired position on the fender 11.

Due to the fact that trunnion members 22 and 23 are firmly secured to fender skirt 10 at their inner ends only, it will be apparent that any tendency to force the skirt downwardly will result in an upwardly exerted biasing force by these members due to the inherent resiliency of the metal bar 20 from which they are formed. As will presently be understood, this assures a snug fit of the fender skirt 10 within the opening 13 of fender 11.

In Figure 4 of the drawings, the precise nature of the resilient skirt retaining fingers or elements 24 is shown. Each finger 24 includes an inner portion 28 which lies in intimate contact with the inner surface of the fender skirt 10, and an outer portion 29 which is adapted to extend into skirt retaining engagement with the finger 11. The inner portion 28 may be secured to the fender skirt 10 in any suitable manner. As illustrated, the portion 28 is secured to the fender skirt 10 by means of a bracket 30 which is riveted to the fender skirt 10 (as may be seen best in Figure 2). It is obvious, however, that any other suitable means may be employed for securing the fingers 24 to the fender skirt 10, such, for example, as by welding the portions 28 of the fingers 24 directly to the inner surface of the fender skirt 10, or by welding the bracket directly to the inner surface of the fender skirt 10. The outer free end of the portion 29 of each finger 24 is provided with a radially outwardly extending hump 30a. The hump 30a of the finger 24 is so dimensioned as to be cammed over the underturned edge 17 of the fender 11 as the fender skirt 10 is moved into position on the fender 11, and then to hold the fender skirt 10 tightly against the fender 11 by the inherent resiliency of the finger.

In order to disengage the fender skirt 10 from the fender 11, a special tool 31 has been found to be particularly suitable for this purpose. The tool 31 is angled as at 32 and is provided with a relatively sharp beveled edge portion 33. A sleeve of yieldable or resilient material 34, such, for example, as rubber, is provided on the tool 31 in proximity to the beveled edge portion 33 and the angled point 32. The provision of this sleeve 34 on the tool 31 eliminates any possibility of scratching or marring the finished surface of the fender 11. To remove the fender skirt 10 from the fender 11, the beveled edge portion 33 is inserted between the edge of the skirt and the fender, as shown in the drawings, and then pressure is applied to the handle of the tool in a direction towards the fender 11. As will readily be understood, the fulcrum point of the tool is at some point around the cushioned part 34.

In Figure 5 of the drawings, I have illustrated a slightly modified form of finger or fender skirt retaining means. In this instance, a resilient finger 35 is mounted on a short stud shaft 36 and retains its desired position thereon by means of two sleeves 37 and 38, which are secured to the shaft 36 in a suitable manner, such as by means of set screws 39 and 40, respectively. The shaft 36 extends through the fender skirt 10 and is provided on its outer end with a manual control knob 41. The finger 35, the sleeves 37 and 38, and the control knob 41 are all mounted on the shaft 36 in such a manner as to prevent relative angular rotation between the various elements. It will thus be seen that in this particular modification of my invention, a positive latch mechanism is provided for securing the skirt in desired position. More specifically, a finger is provided which may be rotated into and out of engagement with the portion 17. As in the preferred embodiment of the invention, the finger 35 is stressed when in its locking engagement with the portion 17, and consequently, due to the inherent resiliency of the finger 35, the fender skirt 10 is firmly and securely held against the fender 11. The finger 35 may obviously either be used as the sole means for securing the skirt 10 in place or it may be used in conjunction with the resilient fingers 24 previously described. When used in the latter manner, the fingers 10 form a temporary snap-on securing means while the finger 35 positively locks the skirt in place.

The manner of assembling and dismounting the ornamental fender skirt shown in Figures 1 to 4, inclusive, of the drawings is as follows: The ornamental fender skirt 10 is moved into proximity to the opening 13 of the vehicle fender 11, and the trunnion members 22 and 23 are then moved into supporting engagement with the underturned edge portions 18 and 19 of the fender 11. The fender skirt 10 is then rotated or rocked about the trunnion members 22 and 23 into engagement with the fender 11. As the circular edge portion of the skirt 10 moves into engagement with the fender 11, the resilient fingers 24 are cammed under the underturned edge portion 17 of the fender 11. As the hump portions 30 of the fingers 24 are forced under the underturned edge portion 17, they snap on into tight skirt retaining engagement with the outer extremity of the underturned edge portion 17. It will thus be seen that the fender skirt 10 has made a simple snap-on engagement with the fender 11, it being only necessary to place the trunnion members 22 and 23 in place and then give the upper part of the fender skirt 10 a sharp push.

To dismount the fender skirt 10 from the fender 11, the sharp beveled edge portion 33 of the tool 31 is inserted between the top edge of the fender skirt 10 and the fender 11, and then by a single push of the tool, the fender skirt 10 is pried off the fender 11, and the trunnion members 22 and 23 may then be lifted out of engagement with the underturned edge portions 18 and 19.

In the modified form of my invention, the fender skirt 10 is assembled in substantially the same way on the fender 11, with the exception that instead of camming the fingers under the underturned edge portion 17 of the fender, the fingers 35 are turned down and then the fender skirt 10 is moved into the desired position on the fender 11. Then by a simple twist of the knob 41, the fingers 35 are moved into skirt retaining engagement with the fender 11.

From the above description, it will be apparent that I have provided an extraordinarily simple arrangement for mounting ornamental fender skirts on vehicle fenders which is economical to manufacture, which is rugged and reliable in use, and which may be readily assembled or disassembled on a vehicle fender by an unskilled person. By providing a fender skirt which may be assembled on a vehicle fender by a simple shove of the person assembling the skirt on the fender, it will readily be appreciated that I have provided an extremely desirable commercial article.

It will, of course, be understood that although the drawings illustrate a rear fender only of a vehicle, an ornamental fender skirt such as that described above may be employed with equal success on the front fender of a vehicle.

It will also be understood that the fender may be supported from the top by offset hooks which extend into engagement with the underturned marginal edge of the fender opening, rather than by trunnion members disposed at the bottom. Under this circumstance, the spring fingers will function in the same manner to effect a snap-on engagement with the vehicle fender.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender skirt having trunnion members at the base thereof for supporting said skirt in rocking engagement on a vehicle fender, and means on said skirt at a point remote from said members for detachably holding said skirt in position on said fender, whereby said skirt may be rocked into and out of detachable engagement with said fender.

2. As an article of manufacture, an ornamental fender skirt having trunnion members extending from opposite ends thereof for supporting said skirt in rocking engagement on a vehicle fender over the wheel opening of the latter, said trunnion members having a portion thereof bent axially inwardly and then axially outwardly, whereby said members may extend around and behind the opening defining edge of said fender.

3. As an article of manufacture, an ornamental fender skirt having trunnion members extending from opposite ends thereof for supporting said skirt in rocking engagement on a vehicle fender over the wheel opening defining edge thereof, said trunnion members having a substantially new shape portion therein, whereby said members may be hooked around the opening defining edge of said fender into supporting engagement with the inside portion of said fender.

4. As an article of manufacture, an ornamental fender skirt having trunnion members at the base thereof for supporting said skirt in rocking engagement on a vehicle fender, and fingers on said skirt at points remote from said members for detachably holding said skirt in position on said fender, said fingers extending axially inwardly and having a hump portion in proximity to their free ends, whereby said skirt may be rocked and snapped into skirt retaining engagement with said vehicle fender.

5. With a vehicle fender having an underturned outer edge defining an opening to permit access to a wheel, an ornamental fender skirt for disposition over said opening, having fender attaching means thereon comprising a bar secured to the base of said skirt having ends extending into skirt supporting and rocking engagement with the underturned edge of said fender, whereby said skirt may be rocked into and out of said fender opening, and means on said skirt remote from said bar for detachably securing said skirt in said fender opening.

6. With a vehicle fender having an underturned outer edge defining an opening to permit access to a wheel, an ornamental fender skirt for disposition over said opening having fender attaching means thereon comprising a bar secured to the base of said skirt, the ends of said bar extending axially inwardly and then axially outwardly around said underturned edge and into skirt supporting engagement therewith, whereby said skirt may be rocked into and out of engagement with said fender, and means for securing said skirt at a point remote from said bar in detachable snap-on engagement with said fender.

7. Supporting and securing means for detachably securing an ornamental fender skirt to a vehicle fender, comprising a supporting means for said skirt which permits angular movement thereof in a plane substantially perpendicular to the plane of the skirt, and additional means on said skirt for preventing angular movement of said skirt after said skirt is assembled on said fender.

8. Supporting and securing means for detachably securing an ornamental fender skirt to a vehicle fender, comprising supporting means for said skirt, which permits angular movement thereof in a plane substantially perpendicular to the plane of the skirt, and additional means on said skirt for preventing angular movement of said skirt after said skirt is assembled on said fender, said supporting means including oppositely extending arms arranged to engage underturned edges of said fender.

9. As an article of manufacture, an ornamental fender skirt having resilient trunnion members for supporting said skirt in rocking engagement on a vehicle fender.

10. As an article of manufacture, an ornamental fender skirt having resilient trunnion members for supporting said skirt in rocking engagement on a vehicle fender over the wheel opening of the fender, and means for securing said skirt in desired position in said fender opening.

11. As an article of manufacture, an ornamental fender skirt having resilient means thereon for supporting said skirt on a vehicle fender and for permitting angular movement of said skirt in a plane substantially perpendicular to its face, and additional means on said skirt for preventing angular movement of said skirt after said skirt is assembled on said fender.

12. As an article of manufacture, an ornamental fender skirt having means thereon for supporting resiliently said skirt on a vehicle fender and for permitting angular movement of said skirt in a plane substantially perpendicular to the plane of said skirt, and means on said skirt remote from said first means for detachably engaging said fender, said engagement being maintained by the resilient action of said first means.

13. The combination with a fender having a wheel opening defined by a turned edge, of a fender skirt for disposition in said wheel opening having a marginal portion formed to nest beneath said turned edge to center said skirt in said opening and to aid in preventing it from shifting upwardly in the plane of the side wall of the fender and means cooperating with the edge of the fender for supporting said skirt vertically in said opening, and snap-on retaining means between said skirt marginal portion and said fender turned edge deflectable into retaining engagement by movement of said skirt into nested engagement with said turned edge and thereafter retaining said skirt against displacement in an axial direction from said nested engagement.

GEORGE ALBERT LYON.